United States Patent
Zhu et al.

(10) Patent No.: US 11,549,222 B2
(45) Date of Patent: Jan. 10, 2023

(54) VERTICAL GROUND HEAT EXCHANGER FOR REDUCING TEMPERATURE IN CARBONACEOUS SHALE ROCK MASS AND PREVENTING ROADBED FROST HEAVE

(71) Applicant: Southwest University of Science and Technology, Mianyang (CN)

(72) Inventors: Baolong Zhu, Mianyang (CN); Xin Li, Mianyang (CN)

(73) Assignee: SOUTHWEST UNIVERSITY OF SCIENCE AND TECHNOLOGY, Mianyang (CN)

( * ) Notice: Subject to any disclaimer, the term of this patent is extended or adjusted under 35 U.S.C. 154(b) by 289 days.

(21) Appl. No.: 17/004,013

(22) Filed: Aug. 27, 2020

(65) Prior Publication Data
US 2021/0355639 A1 Nov. 18, 2021

(30) Foreign Application Priority Data
May 13, 2020 (CN) .......................... 202010401439.0

(51) Int. Cl.
*E01C 3/06* (2006.01)
*F24T 50/00* (2018.01)
(Continued)

(52) U.S. Cl.
CPC ................ *E01C 3/06* (2013.01); *E01C 11/26* (2013.01); *F24T 10/17* (2018.05); *F24T 50/00* (2018.05);
(Continued)

(58) Field of Classification Search
CPC .. E01C 3/06; E01C 11/26; F24T 10/17; F24T 50/00; F24T 2010/56; F28D 15/0266;
(Continued)

(56) References Cited

U.S. PATENT DOCUMENTS 6,931,879 B1 * 8/2005 Wiggs ..................... F25B 13/00
165/45
2007/0289319 A1 * 12/2007 Kim ........................ F24T 50/00
62/175
(Continued)

FOREIGN PATENT DOCUMENTS

| CN | 108286840 A | * | 7/2018 | ............... F25B 30/02 |
| CN | 109537390 A | * | 3/2019 | ............... E01C 3/06 |

(Continued)

*Primary Examiner* — Mickey H France
(74) *Attorney, Agent, or Firm* — Bayramoglu Law Offices LLC

(57) ABSTRACT

A vertical ground heat exchanger for reducing the temperature in the carbonaceous shale rock mass and preventing roadbed frost heave includes a heating mechanism, a heat releasing component respectively connected to both ends of the heating mechanism and a refrigeration heat exchange mechanism. The refrigeration heat exchange mechanism is connected to the lower end of the heating mechanism through a heat transfer pipeline and communicates with the heat releasing component. The heat releasing component includes a double-layer heat exchange tube component, a gas-liquid separator and a branch tube, wherein the double-layer heat exchange tube component is respectively connected to the both ends of the heating mechanism, the gas-liquid separator is connected to the double-layer heat exchange tube component, and the branch tube is connected between the gas-liquid separator and the refrigeration heat exchange mechanism. The double-layer heat exchange tube component includes an upper bellows and a lower bellows.

12 Claims, 4 Drawing Sheets

(51) Int. Cl.
*F24T 10/17* (2018.01)
*F28D 15/02* (2006.01)
*E01C 11/26* (2006.01)
*F28D 21/00* (2006.01)

(52) U.S. Cl.
CPC .. *F28D 15/0266* (2013.01); *F28D 2015/0216* (2013.01); *F28D 2021/0061* (2013.01); *Y02E 10/10* (2013.01)

(58) Field of Classification Search
CPC ..... F28D 2015/0216; F28D 2021/0061; Y02E 10/10; F25B 1/00
USPC .......................................... 165/45; 60/641.2
See application file for complete search history.

(56) References Cited

U.S. PATENT DOCUMENTS

| | | | | |
|---|---|---|---|---|
| 2010/0108294 A1* | 5/2010 | Feldmann | ........... | F28D 15/0266 165/104.19 |
| 2015/0013370 A1* | 1/2015 | Wiggs | .................... | F25B 27/00 62/260 |

FOREIGN PATENT DOCUMENTS

| | | | | | |
|---|---|---|---|---|---|
| DE | 202004018559 U1 | * | 4/2005 | ............... | F24J 3/084 |
| JP | 2001241785 A | * | 9/2001 | ............... | F25B 1/10 |
| JP | 2009287914 A | * | 12/2009 | ............... | F24J 3/084 |
| JP | 2014005983 A | * | 1/2014 | | |

* cited by examiner

VERTICAL GROUND HEAT EXCHANGER FOR REDUCING TEMPERATURE IN CARBONACEOUS SHALE ROCK MASS AND PREVENTING ROADBED FROST HEAVE

CROSS REFERENCE TO THE RELATED APPLICATIONS

This application is based upon and claims priority to Chinese Patent Application No. 202010401439.0, filed on May 13, 2020, the entire contents of which are incorporated herein by reference.

TECHNICAL FIELD

The present invention relates to the technical field of heat exchangers for ground source heat pumps, and more particularly, to a vertical ground heat exchanger for reducing temperature in carbonaceous shale (or black shale) rock mass and preventing roadbed frost heave.

BACKGROUND

Carbonaceous shale (or black shale) is rich in organic matter and sulfide minerals (mainly pyrite). The sulfide minerals in the carbonaceous shale undergo oxidation reactions under the action of water, oxygen and bacteria to generate a large amount of acidic water. The acidic water destroys the structure of the rock mass and deteriorates the physical and mechanical properties of the rock mass, which features the clayization of the carbonaceous shale (or black shale), and it is easy to form the weak zone and related rock and soil disasters. Previous studies have shown that the clayization process of the carbonaceous shale (or black shale) is caused by the oxidation reaction or action of the pyrite, and temperature and bacteria have great catalytic effect on such oxidation reaction. Meanwhile, bacteria also multiply quickly in the heat releasing process of the oxidation reaction, which further promotes the oxidation reaction of the pyrite. Therefore, it is desirable to develop a device for reducing the temperature in the rock mass of the carbonaceous shale (or black shale), effectively delay the oxidation reaction of the pyrite and weaken the structural destruction of the rock mass. Moreover, the device and the drainage system can work jointly, which effectively delays the clayization process of the carbonaceous shale (or black shale), and avoids the occurrence of geotechnical disasters.

In addition, the area of permafrost/seasonal frozen soils and short-term frozen soils on the earth accounts for about 50% of the land area, wherein the permafrost accounts for 25% of the land area. In China, permafrost amounts to 2.15 million square kilometers, which has a deleterious impact on railway and highway construction and maintenance operation. In winter, since the density of water is greater than that of ice, in the frozen state, the volume of the frozen soil, just like ice, expands during the condensation process, and the upper roadbed or rail is jacked up due to expansive action. In summer, the frozen soil melts and the volume shrinks, and the roadbed or rail that was jacked up in winter decreases as the frozen soil melts. Repeated seasonal freezing and melting of soil causes serious deformation and destruction to the roadbed. And railways take on a wavelike deformation, which threatens the safety of rail occupants and operations. In these same areas, shallow geothermal energy is relatively abundant and has large reserves. It is easy to mine. It is quite stable. It is continuous. The geothermal energy resources in such permafrost geographies may thus be further developed and used, so as to achieve the purpose of controlling roadbed frost heave disaster.

The heat exchangers used for the ground source heat pump is designed to reduce the temperature in the carbonaceous shale (or black shale) rock mass, and collects the heat energy for reuse, that is, the heat energy collected from the rock mass can be used to resist the frost heave disaster of the roadbed. Current heat exchangers used for ground source heat pumps are typically filled with a liquid working medium and absorb heat and release heat by gasification and liquefaction, thereby achieving heat exchange. The heat exchanger for a ground source heat pump is mainly composed of an evaporator, a condenser and a compressor.

Present ground heat exchangers are generally formed from polyethylene (PE) tube, but the thermal conductivity of PE is generally low, 0.42 W/(m·K), and its ability to withstand high temperature and high pressure is not particularly optimal. In order to meet existing demand, there are a large number of ground source wells. As a result, the number of buried PE tubes is large, and project cost is significant. In addition to PE, current heat exchangers are formed from metal, enamel, graphite, and the like. During operation, however, since metal corrodes in different environment media, it negatively affects the working life of the metal. Enamel and graphite materials have problems as well. Enamels and graphite are not especially strong and present safety issues when under pressure, like exploding porcelain and brittle fracture. Graphite and enamel materials cannot withstand high temperature and high pressure either and are thus less desirable.

More recently, silicon carbide materials have attracted attention due to properties such as corrosion resistance, high temperature resistance, high thermal conductivity, high hardness and wear resistance. Silicon carbide has developed rapidly in the field of heat pumps. Graphene has a thermal conductivity of up to 5300 W/(m·K) and is hard, and thus, graphene is a suitable material for a heat exchanger. However, graphene is cost prohibitive in some applications and it is difficult to promote and use in large areas. Additionally, when contacting the soil, the refrigerant in current ground heat exchangers has the phenomenon of low heat exchange efficiency and unevenness, and sometimes even leads to secondary frost heave. It is, therefore, necessary to further optimize the mechanism in the heat exchanger to avoid this problem.

SUMMARY

An objective of the present invention is to provide a vertical ground heat exchanger for reducing temperature in carbonaceous shale rock mass and preventing roadbed frost heave, so as to solve the problem of poor heat exchange effect of the heat exchangers in the prior art.

The technical solution of the present invention for solving the above technical problem is as follows. A vertical ground heat exchanger for reducing temperature in carbonaceous shale rock mass and preventing roadbed frost heave includes a heating mechanism, a heat releasing component respectively connected to both ends of the heating mechanism and a refrigeration heat exchange mechanism. The refrigeration heat exchange mechanism is connected to the lower end of the heating mechanism through a heat transfer pipeline and communicates with the heat releasing component.

The heat releasing component includes a double-layer heat exchange tube component, a gas-liquid separator and a branch tube, wherein the double-layer heat exchange tube component is respectively connected to the both ends of the heating mechanism, the gas-liquid separator is connected to the double-layer heat exchange tube component, and the branch tube is connected between the gas-liquid separator and the refrigeration heat exchange mechanism.

The advantages of employing the above technical solution are as follows. The vertical ground heat exchanger has a simple fully-assembled structure, which is convenient for transportation and construction needs. Moreover, production cost for the new heat exchanger is low, and its use is reliable. By continuous heat exchange between the refrigeration heat exchange mechanism and a heat source in external rock-soil body, a low-temperature and low-pressure gas is formed in the heat exchanger, and then enters the heating mechanism to form a high-temperature and high-pressure gas. The high-temperature and high-pressure gas passes through the double-layer heat exchange tube component for heat releasing, and the gas-liquid separator performs diffluence on a gas and liquid, which pass through the double-layer heat exchange tube component to avoid affecting the heat dissipation effect. In this way, the heat dissipation is uniform, the heat exchange effect is improved, and the heat exchange efficiency is high.

Further, the double-layer heat exchange tube component includes an upper bellows, and a lower bellows. The upper bellows is connected to the outlet end of the heating mechanism, and the lower bellows is arranged under and connected to the upper bellows. The gas-liquid separator is arranged between the upper bellows and the lower bellows, and the outlet end of the lower bellows communicates with the refrigeration heat exchange mechanism.

The advantages of employing the above technical solution are as follows. The upper bellows and the lower bellows form a double heat exchange tube structure. After the heating mechanism turns the gas into the high-temperature and high-pressure gas, the high-temperature and high-pressure gas passes through the upper bellows for heat releasing. At this time, the gas and liquid coexist in the upper bellows. The liquid returns to the refrigeration heat exchange mechanism through the gas-liquid separator, while the gas passes into the lower bellows for further heat releasing. The gas after heat releasing enters the refrigeration heat exchange mechanism to achieve a cycle operation. The operation is reliable, and the heat exchange efficiency is high.

Further, the heating mechanism includes a housing and a compressor unit arranged in the housing. The inlet end of the upper bellows penetrates the housing and communicates with the outlet of the compressor unit. The top end of the heat transfer pipeline penetrates the housing and communicates with the inlet of the compressor unit.

The advantages of employing the above technical solution are as follows. The compressor unit performs heating and compression on the gas entering the heating mechanism to form the high-temperature and high-pressure gas and improves the heat exchange state of the gas passing into the upper bellows, which improves the heat exchange effect.

Further, a throttle is arranged at the outlet end of the lower bellows, and an end of the branch tube away from the gas-liquid separator is connected to the throttle.

The advantages of employing the above technical solution are as follows. The throttle turns the gas passing through the lower bellows into low-pressure wet steam and then transfers the low-pressure wet steam to the refrigeration heat exchange mechanism, which improves the recycle utilization rate, ensures the consistency degree with the working state of the refrigeration heat exchange mechanism and improves the reliability of using the heat exchanger.

Further, a flow control valve is arranged between the branch tube and the gas-liquid separator.

The advantages of employing the above technical solution are as follows. The gas flow from the upper bellows into the lower bellows is adjusted by the flow control valve. The adjustment by the flow control valve ensures that the gas flow in the tube is in a constant speed state, which improves the uniformity of heat dissipation and the heat exchange effect.

Further, each of a surface of the upper bellows and a surface of the lower bellows is coated with a graphene coating.

The advantages of employing the above technical solution are as follows. the graphene coating improves corrosion resistance, wear resistance and thermal conductivity performance.

Further, each of the upper bellows and the lower bellows includes a plurality of U-shaped tubes that are continuously connected.

The advantages of employing the above technical solution are as follows. The unique spiral coil structure of the upper bellows and the lower bellows is arranged to further effectively improve the heat dissipation efficiency.

Further, the refrigeration heat exchange mechanism includes a silicon carbide outer cylinder, an inner cylinder arranged in the silicon carbide outer cylinder and a spiral inner tube arranged in the silicon carbide outer cylinder in an axially spiral manner. The upper end of the spiral inner tube communicates with the outlet end of the lower bellows, and the inner cylinder communicates with the lower end of the heat transfer pipeline. A plurality of uniformly distributed air holes are formed in a surface of the upper half portion of the inner cylinder.

A gap is arranged between the silicon carbide outer cylinder and the inner cylinder, and a refrigeration layer is filled in the gap and the spiral inner tube.

The advantages of employing the above technical solution are as follows. The silicon carbide outer cylinder has good thermal conductivity and high efficiency of heat transfer and dissipation, which improves thermal conductivity with the heat source in the external rock-soil body. The inner cylinder and the spiral inner tube form a multi-layer structure, which makes the heat exchange more uniform and improves the heat exchange efficiency. The continuous heat exchange between the refrigeration layer and the soil facilitates the formation of low-temperature and low-pressure gas in the cylinder, and the arrangement of the air hole facilitates reliable circulation between heat exchange gases.

Further, an axial cross section of the spiral inner tube 42 has a semicircular shape.

The advantages of employing the above technical solution are as follows. The unique structure of the spiral inner tube effectively increases the shell side, increases the disturbance, and further makes the refrigerant sufficiently contact the soil, which improves the heat transfer effect and the use performance of the spiral inner tube.

Further, a flange is arranged on the heat transfer pipeline.

The advantages of employing the above technical solution are as follows. By the arrangement of the flange, under the premise of convenient disassembly, the sealing performance is effectively improved, which avoids heat loss and improves the heat exchange effect.

The present invention has the following advantages. The present invention provides a vertical ground heat exchanger. The vertical ground heat exchanger has a simple structure and is a fully-assembled structure, which is convenient for transportation and construction needs. Moreover, the production cost is low and the use is reliable. By continuous heat exchange between the refrigeration heat exchange mechanism and a heat source in external rock-soil body, a low-temperature and low-pressure gas is formed in the heat exchanger, and then enters the heating mechanism to form a high-temperature and high-pressure gas. The high-temperature and high-pressure gas passes through the double-layer heat exchange tube component for heat releasing, and the gas-liquid separator performs diffluence on a gas and liquid which pass through the double-layer heat exchange tube component to avoid affecting the heat dissipation effect. In this way, the heat dissipation is uniform, the heat exchange effect is improved, and the heat exchange efficiency is high.

DETAILED DESCRIPTION OF THE EMBODIMENTS

The principles and features of the present invention will be described hereafter in conjunction with the drawings. The given embodiments are only used to explain the present invention and not to limit its scope.

Figure 1:
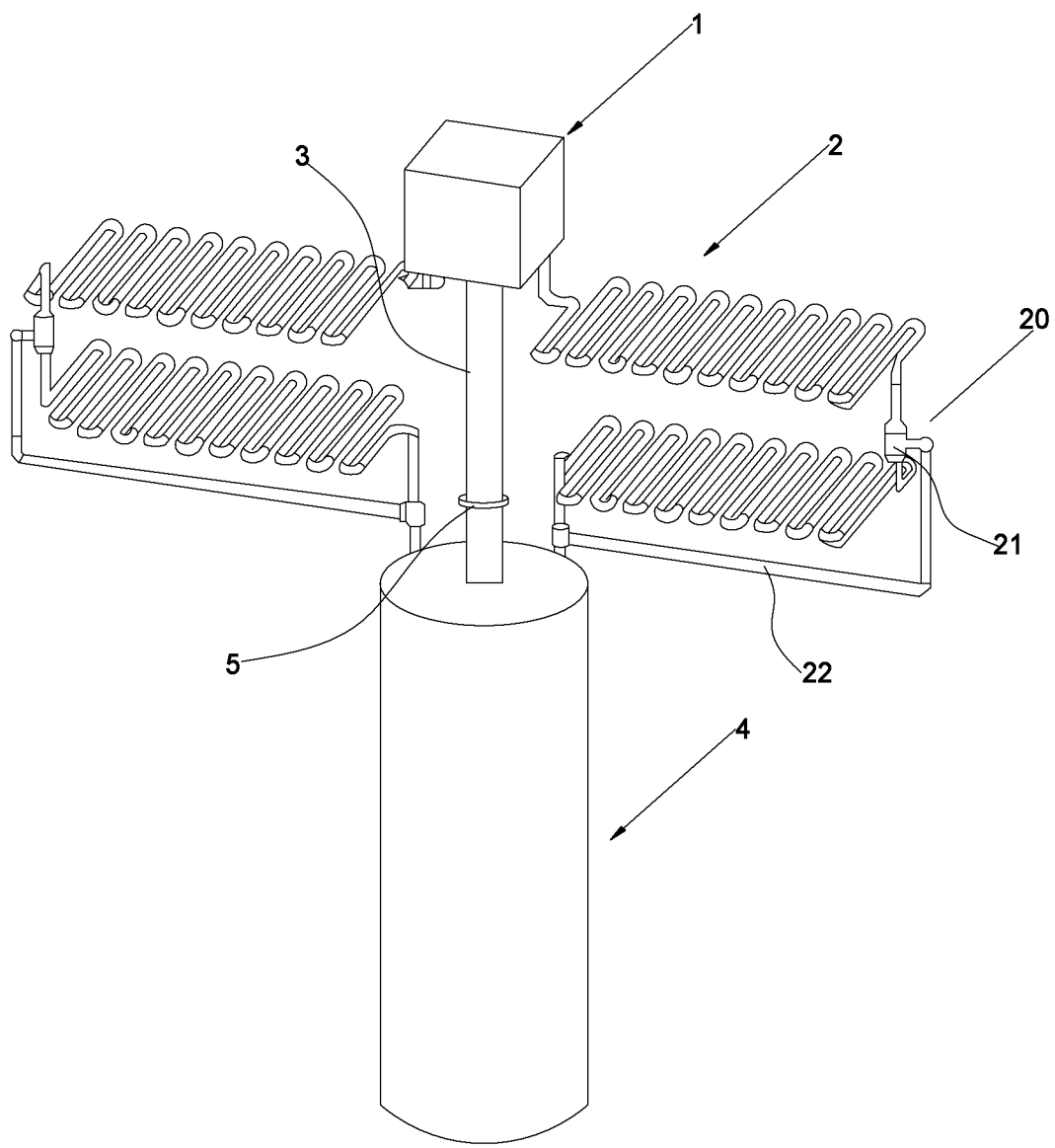
FIG. 1 is a schematic view of the structure of the present invention.
Figure 2:
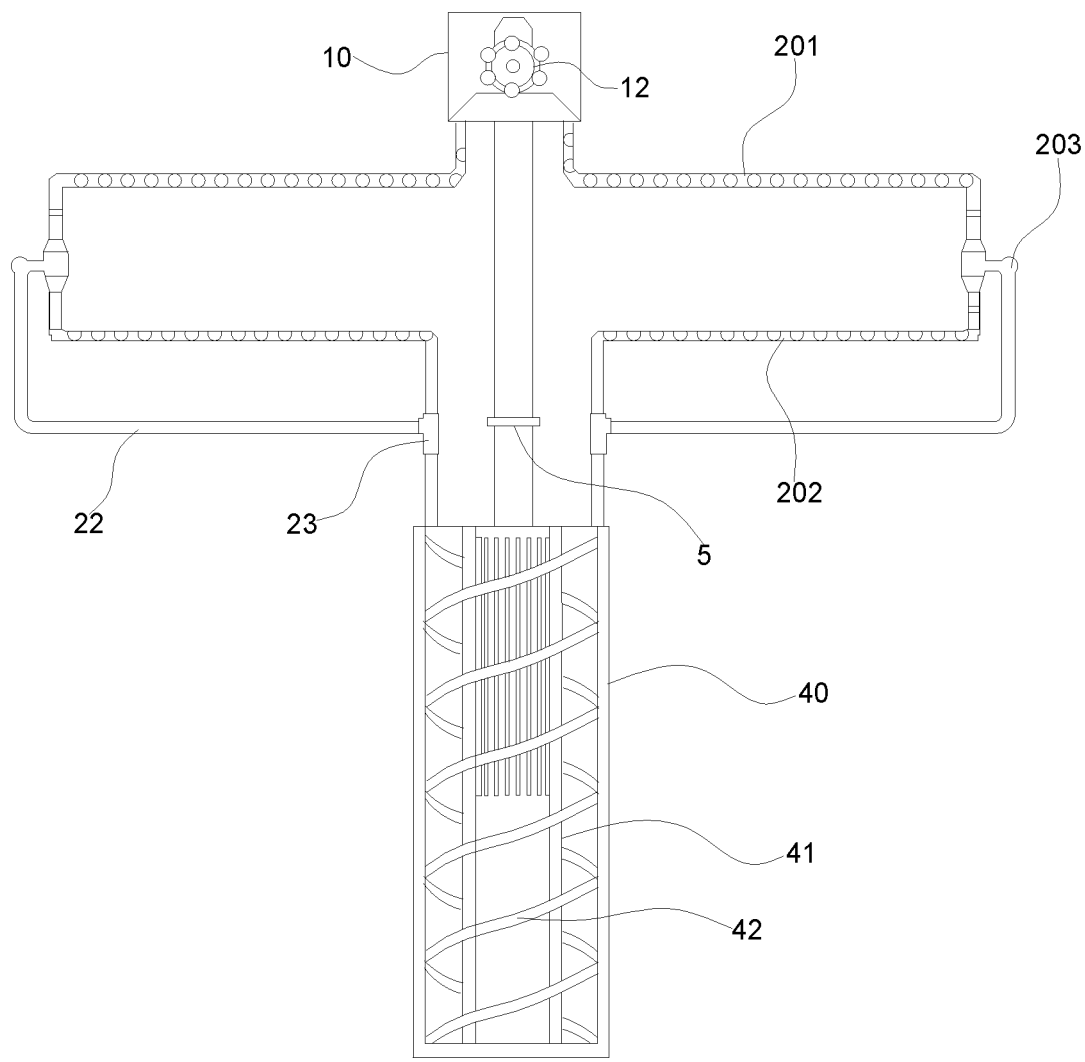
FIG. 2 is a sectional view of the present invention.

As shown in FIGS. 1-2, a vertical ground heat exchanger for reducing temperature in carbonaceous shale rock mass and preventing roadbed frost heave includes the heating mechanism 1, the heat releasing component 2 respectively connected to both ends of the heating mechanism 1 and the refrigeration heat exchange mechanism 4. The refrigeration heat exchange mechanism 4 is connected to the lower end of the heating mechanism 1 through the heat transfer pipeline 3 and communicates with the heat releasing component 2. The heat releasing component 2 includes the double-layer heat exchange tube component 20, the gas-liquid separator 21 and the branch tube 22. Specifically, the double-layer heat exchange tube component 20 is respectively connected to both ends of the heating mechanism 1, the gas-liquid separator 21 is connected to the double-layer heat exchange tube component 20, and the branch tube 22 is connected between the gas-liquid separator 21 and the refrigeration heat exchange mechanism 4.

The vertical ground heat exchanger has a simple structure and is a fully-assembled structure, which is convenient for transportation and construction needs. Moreover, the production cost for the new heat exchanger is low and the use is reliable. By continuous heat exchange between the refrigeration heat exchange mechanism 4 and a heat source in external rock-soil body, a low-temperature and low-pressure gas is formed in the heat exchanger, and then enters the heating mechanism 1 to form a high-temperature and high-pressure gas. The high-temperature and high-pressure gas passes through the double-layer heat exchange tube component 20 for heat releasing, and the gas-liquid separator 21 performs diffluence on a gas and liquid which pass through the double-layer heat exchange tube component 20 to avoid affecting the heat dissipation effect. In this way, the heat dissipation is uniform, the heat exchange effect is improved, and the heat exchange efficiency is high.

The double-layer heat exchange tube component 20 includes the upper bellows 201 and the lower bellows 202. The upper bellows 201 is connected to the outlet end of the heating mechanism 1, and the lower bellows 202 is arranged under and connected to the upper bellows 201. The gas-liquid separator 21 is arranged between the upper bellows 201 and the lower bellows 202. The outlet end of the lower bellows 202 communicates with the refrigeration heat exchange mechanism 4. The upper bellows 201 and the lower bellows 202 form a double heat exchange tube structure. After the heating mechanism 1 turns a gas into the high-temperature and high-pressure gas, the high-temperature and high-pressure gas passes through the upper bellows 201 for heat releasing. At this time, the gas and liquid coexist in the upper bellows 201. The liquid returns to the refrigeration heat exchange mechanism 4 through the gas-liquid separator 21, while the gas passes into the lower bellows 202 for further heat releasing. The gas after heat releasing enters the refrigeration heat exchange mechanism 4 to achieve a cycle operation. The operation is reliable, and the heat exchange efficiency is high.

The heating mechanism 1 includes the housing 10, and the compressor unit 12 arranged in the housing 10. The inlet end of the upper bellows 201 penetrates the housing 10 and communicates with the outlet of the compressor unit 12. The top end of the heat transfer pipeline 3 penetrates the housing 10 and communicates with the inlet of the compressor unit 12. The compressor unit 12 performs heating and compression on the gas entering the heating mechanism 1 to form the high-temperature and high-pressure gas and improves the heat exchange state of the gas passing into the upper bellows 201, which improves the heat exchange effect.

Both the upper bellows 201 and the lower bellows 202 employ a "bellows" texture, which has a heat transfer efficiency 2-4 times higher than that of a general smooth straight tube, and the heat dissipation efficiency is further improved by employing the form of a spiral coil.

The throttle 23 is arranged at the outlet end of the lower bellows 202, and the end of the branch tube 22 away from the gas-liquid separator 21 is connected to the throttle 23. The throttle 23 turns the gas passing through the lower bellows 202 into the low-pressure wet steam and then transfers the low-pressure wet steam to the refrigeration heat exchange mechanism 4, which improves the recycle utilization rate, ensures the consistency degree with the working state of the refrigeration heat exchange mechanism 4, and improves the reliability of using the heat exchanger.

The flow control valve 203 is arranged between the branch tube 22 and the gas-liquid separator 21. The gas flow from the upper bellows 201 into the lower bellows 202 is adjusted by the flow control valve. The adjustment by the flow control valve ensures that the gas flow in the tube is in a constant speed state, which improves the uniformity of heat dissipation and the heat exchange effect.

Figure 3:
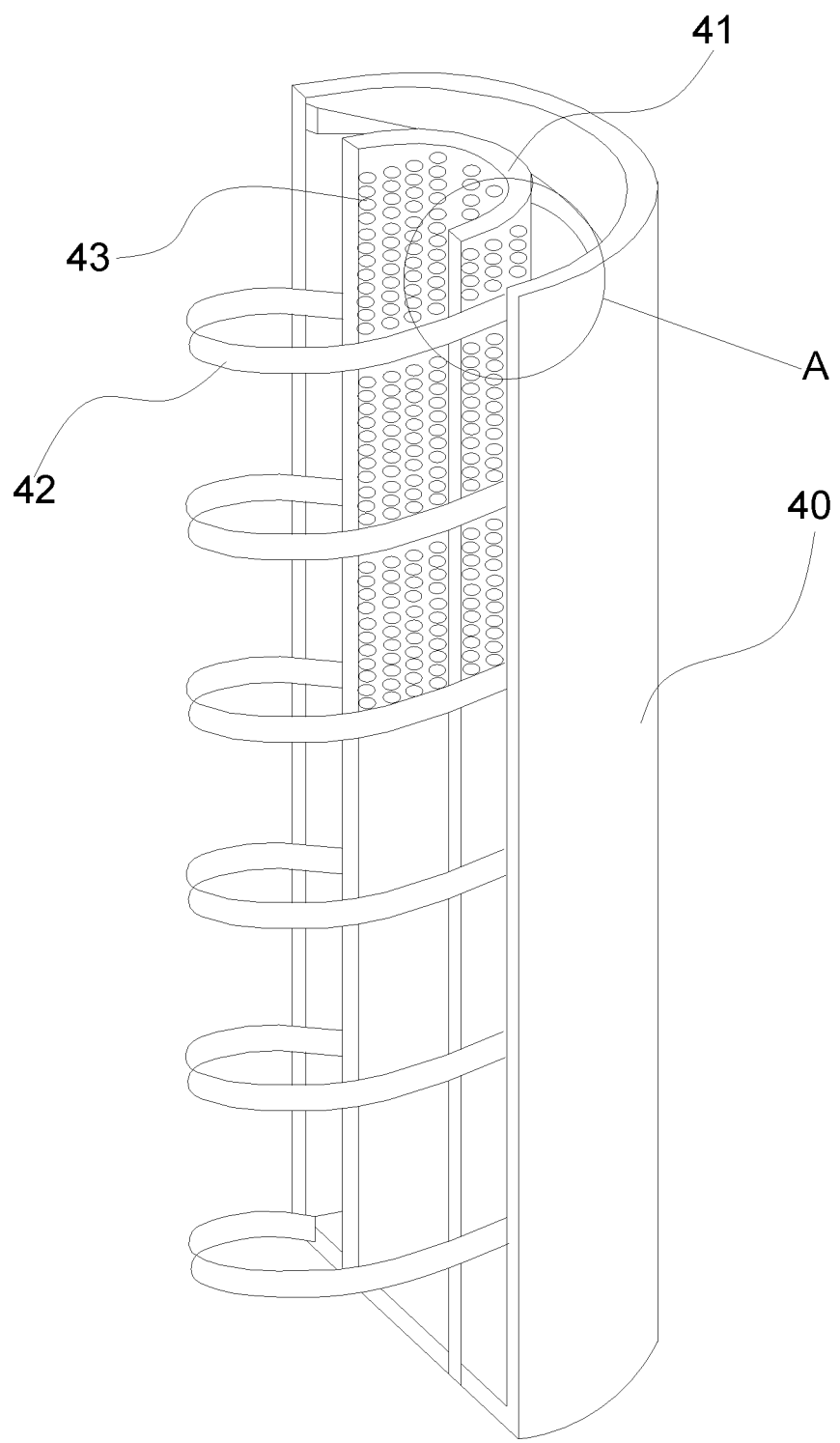
FIG. 3 is a sectional view of the refrigeration heat exchange mechanism in the present invention.
Figure 4:
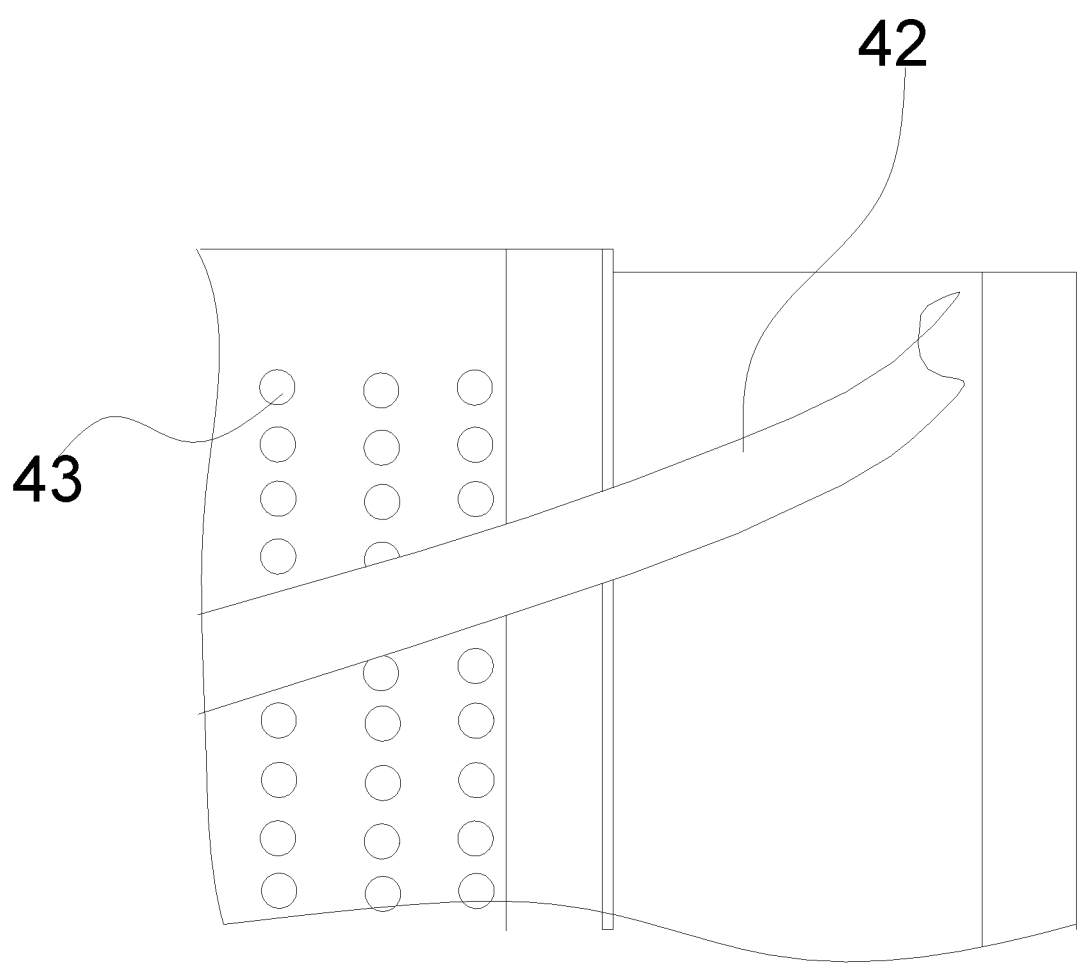
FIG. 4 is an enlarged schematic view of the structure at A in FIG. 3.
In the FIGS.: 1—heating mechanism, 2—heat releasing component, 3—heat transfer pipeline, 4—refrigeration heat exchange mechanism, 20—double-layer heat exchange tube component, 21—gas-liquid separator, 22—branch tube, 201—upper bellows, 202—lower bellows, 10—housing, 12—compressor unit, 23—throttle, 203—flow control valve, 40—silicon carbide outer cylinder, 41—inner cylinder, 42—spiral inner tube, 43—air hole.

As shown in FIGS. 3-4, the refrigeration heat exchange mechanism 4 includes the silicon carbide outer cylinder 40, the inner cylinder 41 arranged in the silicon carbide outer cylinder 40 and the spiral inner tube 42 arranged in the silicon carbide outer cylinder 40 in an axially spiral manner. The upper end of the spiral inner tube 42 communicates with the outlet end of the lower bellows 202, and the inner cylinder 41 communicates with the lower end of the heat transfer pipeline 3. A plurality of uniformly distributed air holes 43 are formed in the surface of the upper half portion of the inner cylinder 41. A gap is arranged between the silicon carbide outer cylinder 40 and the inner cylinder 41, and a refrigeration layer is filled in the gap and the spiral inner tube 42.

The silicon carbide outer cylinder 40 has good thermal conductivity and high efficiency of heat transfer and heat dissipation, which improves the thermal conductivity with the heat source in the external rock-soil body. The inner cylinder 41 and the spiral inner tube 42 form a multi-layer structure, which makes the heat exchange more uniform and improves the heat exchange efficiency. The continuous heat exchange between the refrigeration layer and the soil facilitates the formation of low-temperature and low-pressure gas in the cylinder, and the arrangement of the air holes 43 facilitates reliable circulation between heat exchange gases.

An axial cross section of the spiral inner tube 42 has a semicircular shape. The unique structure of the spiral inner tube 42 effectively increases the shell side, increases the disturbance, and further makes the refrigerant sufficiently contact the soil, which improves the heat transfer effect and the use performance of the spiral inner tube 42.

Each of the surface of the upper bellows 201 and the surface of the lower bellows 202 is coated with a graphene coating. The graphene coating improves corrosion resistance, wear resistance and thermal conductivity performance.

Each of the upper bellows 201 and the lower bellows 202 includes a plurality of U-shaped tubes that are continuously connected. The unique spiral coil structure of the upper bellows 201 and the lower bellows 202 is arranged to further effectively improve the heat dissipation efficiency.

The flange 5 cooperating with the inner cylinder 41 is arranged on the heat transfer pipeline 3. By the arrangement of the flange 5, under the premise of convenient disassembly, the sealing performance is effectively improved, which avoids heat loss and improves the heat exchange effect.

During operation, the boring construction is first performed on the ground. Since the frost heave layer is generally between 0.5 m and 1.5 m underground, the depth of boring should satisfy the condition that the heat dissipation segment is no more than 1.5 m from the earth's surface. The connected heat exchanger is put into the ground hole. After sufficient contact within the spiral inner tube 42 and the silicon carbide outer cylinder 40, the refrigerant layer exchanges a part of heat. The refrigeration layer also continuously exchanges heat with the heat source in the external rock-soil body to from a low-temperature and low-pressure gas, and the low-temperature and low-pressure gas enters the interior of the inner cylinder 41 through the gas hole 43, and then enters the compressor unit through the polypropylene random copolymer (PPR) tube. The compressor unit turns the low-temperature and low-pressure gas into a high-temperature and high-pressure gas, and the high-temperature and high-pressure gas flows through the upper bellows 201 for heat releasing. At this time, the gas and liquid coexist in the upper bellows 201, the liquid first flows into the throttle 23 through the gas-liquid separator 21, and then the gas in the upper bellows 201 flows into the lower bellows 202 for further heat releasing. After heat releasing, the gas in the lower bellows is turned into low-pressure wet steam after passing through the throttle 23, and passes into the lower silicon carbide outer cylinder 40, and then flows into the cylinder bottom along the spiral inner tube 42 attached to the inner wall of the silicon carbide outer cylinder 40, thereby starting another cycle operation. The refrigerant is continuously converted between the gaseous state and the liquid state, and by combining with the excellent thermal conductivity and efficient heat transfer and heat dissipation efficiency of "bellows", "silicon carbide" and "graphene", the heat of the roadbed is continuously taken away to keep the roadbed stable so that it does not break apart or cause railways to take a wavelike shape.

For the purposes of promoting an understanding of the principles of the invention, specific embodiments have been described. It should nevertheless be understood that the description is intended to be illustrative and not restrictive in character, and that no limitation of the scope of the invention is intended. Any alterations and further modifications in the described components, elements, processes or devices, and any further applications of the principles of the invention as described herein, are contemplated as would normally occur to one skilled in the art to which the invention pertains.

What is claimed is:

1. A vertical ground heat exchanger for reducing a temperature in a carbonaceous shale rock mass and preventing roadbed frost heave, comprising a heating mechanism, a heat releasing component respectively connected to both ends of the heating mechanism, and a refrigeration heat exchange mechanism, wherein the refrigeration heat exchange mechanism is connected to a lower end of the heating mechanism through a heat transfer pipeline and the refrigeration heat exchange mechanism communicates with the heat releasing component; and the heat releasing component comprises a double-layer heat exchange tube component, a gas-liquid separator and a branch tube, wherein the double-layer heat exchange tube component is respectively connected to the both ends of the heating mechanism, the gas-liquid separator is connected to the double-layer heat exchange tube component, and the branch tube is connected between the gas-liquid separator and the refrigeration heat exchange mechanism.

2. The vertical ground heat exchanger for reducing the temperature in the carbonaceous shale rock mass and preventing roadbed frost heave according to claim 1, wherein the double-layer heat exchange tube component comprises an upper bellows and a lower bellows, wherein the upper bellows is connected to an outlet end of the heating mechanism, the lower bellows is arranged under the upper bellows and the lower bellows is connected to the upper bellows; the gas-liquid separator is arranged between the upper bellows and the lower bellows, and an outlet end of the lower bellows communicates with the refrigeration heat exchange mechanism.

3. The vertical ground heat exchanger for reducing the temperature in the carbonaceous shale rock mass and preventing roadbed frost heave according to claim 2, wherein the heating mechanism comprises a housing and a compressor unit arranged in the housing; an inlet end of the upper bellows penetrates the housing and communicates with an outlet of the compressor unit; and a top end of the heat transfer pipeline penetrates the housing and communicates with an inlet of the compressor unit.

4. The vertical ground heat exchanger for reducing the temperature in the carbonaceous shale rock mass and preventing roadbed frost heave according to claim 2, wherein a throttle is arranged at the outlet end of the lower bellows, and an end of the branch tube is connected to the throttle, and wherein the end of the branch tube is away from the gas-liquid separator.

5. The vertical ground heat exchanger for reducing the temperature in the carbonaceous shale rock mass and preventing roadbed frost heave according to claim 4, wherein a flow control valve is arranged between the branch tube and the gas-liquid separator.

6. The vertical ground heat exchanger for reducing the temperature in the carbonaceous shale rock mass and preventing roadbed frost heave according to claim 2, wherein each of a surface of the upper bellows and a surface of the lower bellows is coated with a graphene coating.

7. The vertical ground heat exchanger for reducing the temperature in the carbonaceous shale rock mass and preventing roadbed frost heave according to claim 6, wherein each of the upper bellows and the lower bellows comprises a plurality of U-shaped tubes, and the plurality of U-shaped tubes are continuously connected.

8. The vertical ground heat exchanger for reducing the temperature in the carbonaceous shale rock mass and preventing roadbed frost heave according to claim 2, wherein the refrigeration heat exchange mechanism comprises a silicon carbide outer cylinder, an inner cylinder arranged in the silicon carbide outer cylinder, and a spiral inner tube arranged in the silicon carbide outer cylinder in an axially spiral manner; an upper end of the spiral inner tube communicates with the outlet end of the lower bellows, and the inner cylinder communicates with a lower end of the heat transfer pipeline; and a plurality of uniformly distributed air holes are formed in a surface of an upper half portion of the inner cylinder; and a gap is arranged between the silicon carbide outer cylinder and the inner cylinder, and a refrigeration layer is filled in the gap and the spiral inner tube.

9. The vertical ground heat exchanger for reducing the temperature in the carbonaceous shale rock mass and preventing roadbed frost heave according to claim 8, wherein an axial cross section of the spiral inner tube has a semi-circular shape.

10. The vertical ground heat exchanger for reducing the temperature in the carbonaceous shale rock mass and preventing roadbed frost heave according to claim 9, wherein a flange is arranged on the heat transfer pipeline.

11. The vertical ground heat exchanger for reducing the temperature in the carbonaceous shale rock mass and preventing roadbed frost heave according to claim 3, wherein each of a surface of the upper bellows and a surface of the lower bellows is coated with a graphene coating.

12. The vertical ground heat exchanger for reducing the temperature in the carbonaceous shale rock mass and preventing roadbed frost heave according to claim 4, wherein each of a surface of the upper bellows and a surface of the lower bellows is coated with a graphene coating.

* * * * *